May 19, 1925.

H. S. CONKLIN 1,538,169

FLOATER FOR GLASS FURNACES

Filed April 7, 1924

INVENTOR
Harry S. Conklin
BY C.A. Rowley
ATTORNEY

Patented May 19, 1925.

1,538,169

UNITED STATES PATENT OFFICE.

HARRY S. CONKLIN, OF CHARLESTON, WEST VIRGINIA, ASSIGNOR TO THE LIBBEY-OWENS SHEET GLASS COMPANY, OF TOLEDO, OHIO, A CORPORATION OF OHIO.

FLOATER FOR GLASS FURNACES.

Application filed April 7, 1924. Serial No. 704,648.

*To all whom it may concern:*

Be it known that I, HARRY S. CONKLIN, a citizen of the United States, residing at Charleston, in the county of Kanawha and State of West Virginia, have invented new and useful Improvements in Floaters for Glass Furnaces, of which the following is a specification.

This invention relates to improvement in tank furnaces, and more particularly to an improved type of floater for use in such a furnace.

In continuous tank furnaces, through which molten glass flows from the melting end through the refining portion of the tank to the glass-working machine, it is often customary to place a refractory floater transversely of the tank in the surface glass. This floater will have sufficient buoyancy to float practically submerged within the molten glass but with its upper edge extending above the glass level to prevent the flow of any surface glass past this refractory dam. The glass which passes from one side of the floater to the other must flow down beneath the refractory member. This serves to hold back the surface glass which may have dirt or other impurties floating on its upper surface, and also enforces a deeper flow of the glass through the tank since all glass reaching the down-stream side of the floater must pass downwardly beneath the lowermost portion of the floater.

According to this invention the lower submerged portion of the floater is made considerably wider than the upper portion which extends above the glass surface. This lower submerged portion of the floater extends to the up-stream side of the floater, so as to provide a ledge or pocket along this side over which the surface glass may flow against the upwardly extending wall of the floater. However, this submerged portion will tend to prevent the surface glass which flows in above the ledge from passing downwardly under the floater. In this way the floater acts to collect the surface impurities, and hold them until they may be skimmed out at suitable openings in the sides of the tank.

The invention will be better understood from the following detailed description of one approved type of the apparatus.

Figure 1:
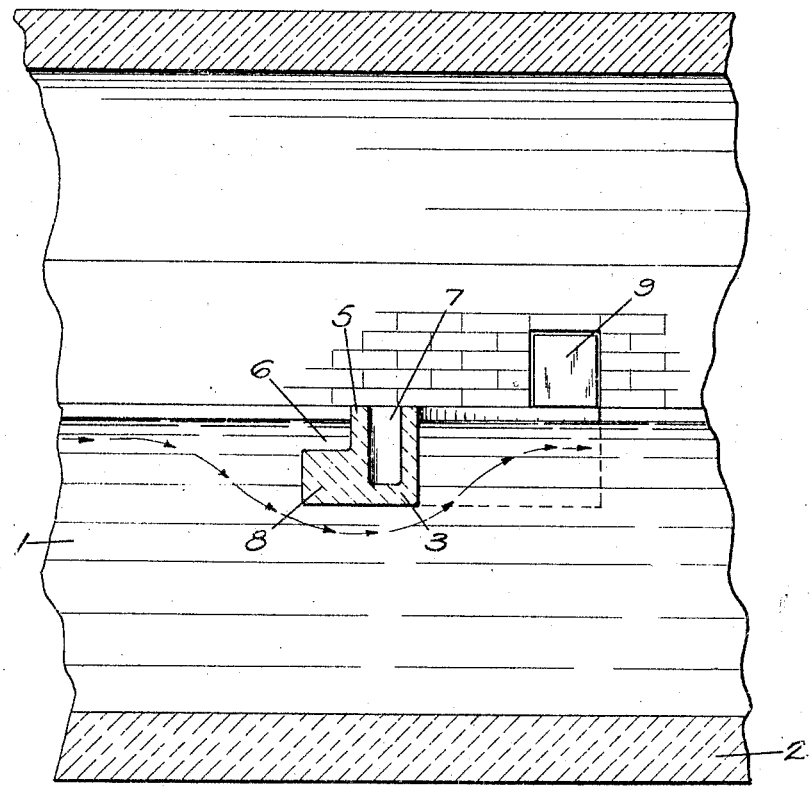
Fig. 1 is a longitudinal vertical section through the center of that portion of the tank or furnace in which this improved floater is installed.
Figure 2:
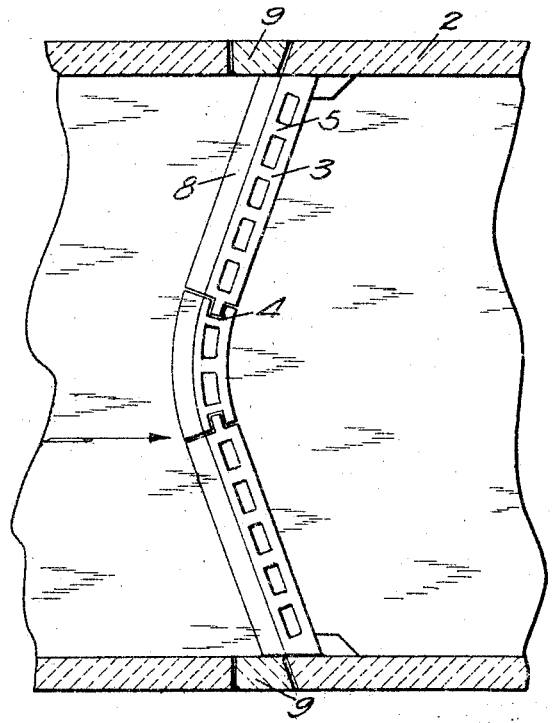
Fig. 2 is a plan view of this portion of the tank, and the floater, on a somewhat smaller scale.

The molten glass 1 flows slowly through the tank or furnace 2 from the melting end of the furnace which will be at the left of Fig. 1 toward the glass-working machine which will be at the right in said figure. The improved floater 3, preferably made of fire-clay, extends transversely of the tank, as shown more particularly in Fig. 2, the floater usually being formed in several sections with tongue and groove connections 4 as shown, the floater being arched in the up-stream direction so that the force of the flowing glass will anchor the floater in place against the sides of the tank.

At its down-stream side the floater 3 has a wall 5 extending somewhat above the surface of the molten glass, but at its up-stream side the floater is cut away as at 6 to provide a ledge for collecting the extreme upper strata of the surface glass. The main upwardly extending portion 5 of the floater will be provided with a series of holes or openings 7 to lessen its weight so that this portion of the floater will be balanced by the entirely submerged portion 8 extending along the up-stream side.

As the molten glass flows through the tank in the direction of the arrows, the upper strata of glass must flow downwardly beneath the floater and then come up on the opposite side. The extreme surface portions of the glass will flow into the pocket 6 above the ledge 8 and be prevented by this ledge or submerged portion of the floater from passing directly downwardly beneath the floater. Since the sides of the floater are inclined in a down-stream direction towards the sides of the tank, this surface glass will tend to flow toward the sides of the tank and may be removed by inserting suitable skimming tools through the openings 9 in the side walls.

Claims:

1. A refractory floater for use in a glass tank, the floater having a glass retaining ledge along one side below the glass level.

2. A refractory floater for use in a glass tank, comprising a glass obstructing portion extending above and below the glass level, and a glass retaining portion positioned entirely below the glass level.

3. A refractory floater for use in a glass tank, comprising a glass obstructing portion extending above and below the glass level, and a glass retaining portion positioned entirely below the glass level on the up-stream side of the floater.

4. A refractory floater adapted for use transversely of a continuous tank furnace, the floater being arched so that its central portion will extend further up-stream than its end portions, the floater having a glass retaining ledge below the glass level on the up-stream side.

5. In combination with a glass tank having skimming openings in its opposite side walls, a floater adapted to lie in the molten glass transversely of the tank with its ends adjacent the openings, the floater having a glass retaining ledge below the glass level on the up-stream side.

Signed at Charleston, in the county of Kanawha and State of West Virginia, this 4th day of April, 1924.

HARRY S. CONKLIN.